United States Patent [19]

Montoya

[11] Patent Number: 5,731,057
[45] Date of Patent: Mar. 24, 1998

[54] PROTECTIVE BARRIER COMPOSITION AND SURFACE PROTECTION METHOD

[76] Inventor: Louis Montoya, 22166 Louise St., Perris, Calif. 92570

[21] Appl. No.: 643,419

[22] Filed: May 8, 1996

[51] Int. Cl.$^6$ ............................................. D06N 7/04
[52] U.S. Cl. .................. 428/142; 428/492; 428/688; 106/2; 106/18.32
[58] Field of Search ............................. 428/492, 688, 428/142; 106/18.32, 2

[56] References Cited

U.S. PATENT DOCUMENTS

| | | | |
|---|---|---|---|
| 4,082,830 | 4/1978 | Cogliano | 264/213 |
| 4,087,472 | 5/1978 | Yi | 219/121 |
| 4,169,088 | 9/1979 | Hansen | 260/29.6 WB |
| 4,241,141 | 12/1980 | Dill | 428/500 |
| 4,347,266 | 8/1982 | Norman et al. | 427/154 |
| 4,353,745 | 10/1982 | Ebbeler | 106/2 |
| 4,472,540 | 9/1984 | Barker | 523/220 |
| 4,897,313 | 1/1990 | Wiercinski | 428/489 |
| 5,071,479 | 12/1991 | Gruening | 106/18.32 |
| 5,143,949 | 9/1992 | Grogan et al. | 523/334 |
| 5,177,154 | 1/1993 | Moro | 525/328 |
| 5,186,978 | 2/1993 | Woodhall et al. | 427/154 |
| 5,225,505 | 7/1993 | Wiegert | 526/245 |
| 5,281,436 | 1/1994 | Swidler | 427/156 |
| 5,354,881 | 10/1994 | Chang et al. | 556/419 |
| 5,376,705 | 12/1994 | Leys et al. | 523/417 |
| 5,567,247 | 10/1996 | Hawes et al. | 134/36 |
| 5,583,230 | 12/1996 | Mitamura et al. | 546/153 |

*Primary Examiner*—H. Thi Le
*Attorney, Agent, or Firm*—Oppenheimer Poms Smith

[57] ABSTRACT

A composition for protecting an exposed surface from the formation and growth of mildew and from other environmental soiling and from defacement by graffiti marking is provided in the form of an aqueous latex rubber solution which may also contain a bleaching agent. The composition is applied to the surface to be protected as an aqueous solution which, following application, dries and cures to form a transparent protective barrier. The barrier can be removed when desired simply by washing with soap and water.

20 Claims, No Drawings

PROTECTIVE BARRIER COMPOSITION AND SURFACE PROTECTION METHOD

BACKGROUND OF THE INVENTION

The present invention relates to a protective barrier composition for protecting a surface against the effects of mildew, and other environmental soilings, as well as deliberate defacement by application of graffiti and the like.

Environmental soiling, such as mildew formation and growth, causes problems with surfaces exposed to the environment. Mildew, for example, results in staining and creates the need for frequent cleaning, both for reasons of appearance and also for protection against surface deterioration caused by mildew. Mildew preventives are known, but those most widely used, which include cresols, phenols, benzoic acid, formaldehyde, and organic derivatives or salts of copper, zinc, and mercury, are generally toxic materials.

The application of graffiti in the form of words, lettering, pictures and the like to buildings and other unprotected surfaces such as public highway signs, walls, and fences has also become a considerable problem in many countries, particularly the United States. Graffiti is most often applied using an aerosol paint can, but may be applied using other marking devices such as felt tip pens, paintbrushes, and the like. It is very difficult to remove graffiti from certain surfaces, particularly porous surfaces such as brick, stone, concrete and the like, where the graffiti marking substance tends to penetrate the surface to which it is applied. Cleaning of graffiti defaced surfaces is costly and time consuming, requiring special, high strength cleaning agents, and, in the case of some surfaces, removal of part of the surface by sandblasting, where the markings have penetrated the surface. Refinishing of the surface after graffiti removal is thus often required, adding to the time and expense involved.

Protective coatings have been proposed in the past for coating surfaces to provide a barrier to protect the underlying surface from any graffiti applied on top of the coating, and to make graffiti removal easier. These coatings act as a sacrificial barrier, because the coating must be removed along with any applied graffiti. The coating prevents passage of marking material through the coating into the underlying surface, so that the surface is typically completely unmarked after the coating is removed. A new barrier coating must be applied after each graffiti removal. Some of the known graffiti barrier coatings require the use of organic solvents for removal. These solvents may be toxic, causing a health hazard as well as potential environmental pollution. On the other hand, some known barrier coatings do not completely protect the surface, and marks may still be left on the surface after removal.

It is therefore an object of the present invention to provide a new and improved protective barrier for any type of accessible surface which would otherwise be subject to mildew, other types of environmental soiling, and defacement by graffiti.

Another object of this invention is to provide a method for protecting surfaces against mildew formation and growth, other types of environmental soiling, and defacement by graffiti.

Another object is to provide readily utilized means for removing graffiti and for preventing mildew formation.

Other objects and advantages of the present invention will become apparent from the following detailed disclosure and description.

SUMMARY OF THE INVENTION

According to the present invention, a latex rubber coating composition is used for protecting various surfaces against mildew, other environmental soiling, and graffiti.

It has been found, surprisingly, that an aqueous natural latex rubber solution provides a nontoxic and nonpolluting barrier effective in preventing mildew formation. The latex rubber solution of the present invention can also be used as a protective coating against environmental soiling of many other kinds and as a barrier to prevent transmission of graffiti markings onto an underlying surface. The coating or barrier is durable even in outdoor conditions but is easily removable with a nontoxic soap and water solution. In the prior art, relatively complex mixtures of chemicals, some of which were potentially dangerous, were used in such coatings and barriers, requiring the frequent use of environmentally undesirable solvents and other chemicals.

DESCRIPTION OF THE PREFERRED ENVIRONMENT

The present invention utilizes an aqueous solution of natural latex rubber to provide a protective barrier against mildew, other environmental soiling, and graffiti defacement. Raw latex rubber is natural rubber as tapped from a rubber tree. Ammonia is generally added to the raw latex rubber within four hours of tapping to prevent coagulation.

For purposes of the present invention, the latex rubber is dissolved in water in a concentration of 1 part latex rubber to 1 to 100 parts water, preferably a concentration of 1 part latex rubber to 4 to 10 parts water, and most preferably a combination of 1 part latex rubber to 5 to 8 parts water. Except for the ammonia, natural latex rubber contains no additives and is nontoxic and environmentally acceptable.

A bleaching agent can be incorporated into the latex solution, if desired, to prevent yellowing. Any commercially available bleach, for example, common household bleaches such as Clorox bleach or hydrogen peroxide, can be used. Hydrogen peroxide is preferred. The bleaching agent is used in a ratio of 1 part bleaching agent to 1 to 40 parts latex rubber solution.

If hydrogen peroxide is used as the bleaching agent, a small quantity of a deodorizing agent may be added to the mixture to mask the unpleasant odor of the latex rubber solution. Any suitable deodorizing agent may be used, such as Arm & Hammer baking soda, which is an effective deodorizing agent, or vanilla extract, which acts as a masking agent and will impart a pleasant, vanilla-like aroma to the mixture. If a common household bleach is used as the bleaching agent, it will provide a more acceptable odor, in addition to taking out the color of the mixture, so that no additional deodorizing agent will be needed in this case. The deodorizer, if used, can be added in concentrations of about 1 to 10 parts of deodorizing agent per 128 parts of latex rubber solution, about 1 to 10 ounces of deodorizing agent per gallon of latex rubber solution. All mixing can be conducted at ambient temperatures and pressures.

The composition of the present invention is applied to the surface in any suitable manner, such as by spraying, brushing, or rolling, or by any other conventional application means such as is used in paint application. The amount of the barrier needed to adequately coat a surface will be dependent on the nature of the surface, with a greater quantity being needed to provide adequate coverage on more porous surfaces such as stucco, brick, cement or the like, and a smaller quantity being needed on smooth surfaces such as metal signs. Typically, the coating density will be around 150 to 300 square feet per gallon for stucco, brick or similar porous surfaces, and 600 to 800 square feet per gallon for smooth surfaces. On a porous surface, at least two coats will be applied, with about 10 to 15 minutes drying time between coats. Three coats may be used for a stucco surface. The barrier may be sprayed or painted on, or may be applied with a roller or the like, and one layer of barrier composition will have a thickness of the order of that of a layer of paint on a surface.

After application, the barrier will dry relatively quickly and will be cured completely in 48 hours. However, the coating will be usable as a protective barrier as soon as it is dried completely, which occurs within five to twenty minutes. The coating forms a transparent shield or barrier layer of clear latex rubber over the underlying surface, and will be more or less invisible after curing. Dirt such as dust and the like will fall on the barrier layer and will not contact the surface. Mildew will not grow on the barrier. Additionally, any graffiti markings applied on the barrier layer will be prevented from contacting and marking the underlying surface.

If graffiti is applied on the protective coating or if the coating becomes excessively soiled, the markings can be removed, together with the protective coating, by scrubbing off with a simple soap and water mixture. There will be no marks left on the underlying surface. A new protective barrier coating is then applied.

Natural latex rubber does not detract from the appearance of the underlying surface and will protect the surface from mildew or other environmental soiling or from damage caused by graffiti application. A bleaching agent, if used, takes out any color from the barrier so that it will not yellow upon standing.

The invention will now be further described by reference to specific examples which are included merely for purposes of illustration and are not be construed as limiting the scope of the present invention which is defined in the claims appended hereto.

EXAMPLE 1

Water was added to natural latex rubber, a white, creamy paste-like liquid, in a proportion of 5 parts water to 1 part latex rubber. Before mixing or agitating the resulting mixture, a 3% hydrogen peroxide solution was added in a proportion of 4 oz. hydrogen peroxide solution to 1 gallon of water/latex rubber mixture. Clear vanilla extract was then added to the mixture in a proportion of 1 oz. vanilla to 1 gallon of the mixture of water, latex rubber, and hydrogen peroxide. The mixture was then stirred slowly to mix the ingredients without too much agitation, and the resulting composition was placed in a sealed container until needed for application.

EXAMPLE 2

Water was added to natural latex rubber in a proportion of 8 parts water to 1 part latex rubber. Clorox household bleach was then added to the resultant mixture in a proportion of 4 ounces bleach to 1 gallon water/latex rubber mixture. The mixture was stirred to mix the ingredients with minimal agitation, and the composition was placed in a sealed container until needed for use.

EXAMPLE 3

The procedure of Example 2 was followed except that no bleach was added.

EXAMPLE 4

The procedure of Example 1 was followed except that Arm & Hammer baking soda in a proportion of 2 ounces baking soda to 1 gallon of the mixture of water, latex rubber, and hydrogen peroxide was used instead of vanilla extract.

EXAMPLE 5

The composition of Example 3 above was applied to a stucco building exterior at a coating density of 300 square feet per gallon and was found to form an effective barrier to graffiti imprinting on the building surface. The barrier was found to have some discoloration after four months. Washing with soap and water readily removed the barrier along with any applied graffiti.

EXAMPLE 6

The composition of Example 1 was applied to a stucco building exterior at a coating density of 300 square feet per gallon. The barrier prevented mildew formation and remained intact for a period of 8 months without yellowing.

EXAMPLE 7

The composition of Example 2 was applied to outdoor cinder block shower enclosures at a coating density of 150 square feet per gallon. No sign of mildew was observed during an 8-month period. Before applying the barrier, washing to remove mildew had been required every 2–3 weeks.

The advantage of the barrier composition and method of this invention is that both the coating materials and the cleaning materials are nontoxic and do not have any adverse health or environmental effects, unlike some of the previous protective barrier coatings and removal compositions. The barrier is quick and easy to apply, will be substantially invisible to the eye after application, and will not detract from the appearance of the building, monument, statue or the like to which it is applied. It may be used to protect any type of surface from mildew or other environmental soiling or from graffiti transmission onto the surface. Trees, rocks, cars, buildings, monuments, signs, statues, walls, and fences, for example, can be protected in this manner. The barrier is long lasting and is not affected by rain or other adverse weather conditions. Once dirt or graffiti is applied on the barrier, the surface can be restored quickly and easily to its original appearance simply by washing off the barrier, along with any applied dirt or graffiti, using a simple soap and water solution. A new barrier can then be applied. Similarly, the barrier can be restored to protect the surface from mildew formation and growth and from other forms of environmental staining whenever desired.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited to the particular embodiments which have been described in detail herein. Rather, reference should be made to the appended claims as indicative of the scope and content of the present invention.

What is claimed is:

1. A coating composition for forming a protective barrier coating on a surface for preventing mildew formation and growth and for preventing transmission of environmental soiling or graffiti marking through the barrier coating onto the surface, the composition comprising:

a curable solution of latex rubber and water in a concentration of 1 part latex rubber to about 1 to 100 parts water, said latex rubber comprising raw latex rubber to which ammonia has been added to prevent coagulation; and a bleaching agent in a concentration of 1 part bleaching agent to about 1 to 40 parts of said solution.

2. The composition of claim 1, wherein the concentration of latex rubber in said solution is 1 part latex rubber to about 4 to 10 parts water.

3. The composition of claim 1, wherein the concentration of latex rubber in said solution is 1 part latex rubber to about 5 to 8 parts water.

4. The composition of claim 1, wherein the bleaching agent is a household bleach.

5. The composition of claim 1, wherein the bleaching agent is hydrogen peroxide.

6. The composition of claim 1, wherein said composition also includes a deodorizing agent.

7. The composition of claim 6, wherein said deodorizing agent is baking soda.

8. The composition of claim 6, wherein said deodorizing agent is vanilla.

9. The composition of claim 6, wherein said deodorizing agent is present in a concentration of about 1 to 10 parts of deodorizing agent to 128 parts latex rubber solution.

10. A method of protecting a surface against the formation and growth of mildew, against other environmental soiling, and against defacement by graffiti, which comprises the steps of:

applying to a surface to be protected a composition comprising an aqueous solution of latex rubber, said latex rubber comprising raw latex rubber to which ammonia has been added to prevent coagulation, said solution having a concentration of 1 part latex rubber to about 1 to 100 parts water;

drying said solution upon said surface to form a barrier coating thereon; and curing said barrier coating, whereby mildew formation and growth upon said surface, environmental soiling of said surface, and defacement of said surface by graffiti marking is prevented.

11. The method of claim 10 which comprises the additional step of washing off said barrier coating, along with any environmental soiling or graffiti applied to said barrier coating, with a soap and water solution.

12. The method of claim 10, wherein the concentration of latex rubber in said solution is 1 part latex rubber to about 4 to 10 parts water.

13. The method of claim 10, wherein the concentration of latex rubber in said solution is 1 part rubber to about 5 to 8 parts water.

14. The method of claim 10, wherein said solution additionally comprises a bleaching agent present in a concentration of 1 part bleaching agent to about 1 to 40 parts of said solution.

15. The method of claim 14, wherein said bleaching agent is a household bleach.

16. The method of claim 14, wherein said bleaching agent is hydrogen peroxide.

17. The method of claim 10, wherein said solution additionally comprises a deodorizing agent present in a concentration of about 1 to 10 parts deodorizing agent to 128 parts of said solution.

18. The method of claim 17, wherein said deodorizing agent is baking soda.

19. The method of claim 17, wherein said deodorizing agent is vanilla.

20. A solid surface with a barrier coating, removable by washing with soap and water, for protecting the surface from mildew, other environmental soiling, and defacement by graffiti, which comprises:

a surface; and a transparent protective barrier coating of cured latex rubber applied to said surface, said barrier coating comprising the product of application to said surface of an aqueous latex rubber solution having a concentration of 1 part latex rubber to about 1 to 100 parts water, said latex rubber comprising raw latex rubber to which ammonia has been added to prevent coagulation, said aqueous latex rubber solution having been dried and cured following application to said surface.

* * * * *